United States Patent Office 3,510,437
Patented May 5, 1970

3,510,437
BASIC NITROGEN POLYCONDENSATES AND DYE-RECEPTIVE POLYOLEFIN COMPOSITIONS CONTAINING SUCH POLYCONDENSATES
Alberto Bonvicini and Giuseppe Cantatore, Terni, Italy, assignors to Montecatini Edison S.p.A., Milan, Italy, a corporation of Italy
No Drawing. Filed May 22, 1967, Ser. No. 640,336
Claims priority, application Italy, May 27, 1966, 12,363/66
Int. Cl. C08d 33/06
U.S. Cl. 260—2
2 Claims

ABSTRACT OF THE DISCLOSURE

New basic polycondensates obtained by reacting the condensation product of epichlorohydrin and a heterocyclic seven-membered disecondary diamine, this condensation product having the formula:

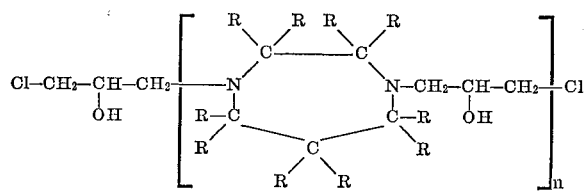

wherein R radicals are the same or different radicals selected from the group consisting of hydrogen and alkyl radicals having 1–12 carbon atoms, and $n$ is an integer from 1 through 100, with a polyamine containing primary amino groups of the type

R—HN . . . X . . . NH$_2$

where R is H, an alkyl group or a residue of a heterocyclic nucleus and X is a residue of a bivalent hydrocarbon, optionally containing S, N, O, etc., for example, hexamethylenediamine, ethylenediamine, diethylenetriamine, tetraethylenepentamine, aminoethylpiperazine N-methylhexamethylenediamine, N-isopropylhexamethylenediamine, 3,3-diaminodipropylether, 3,3'-diaminodiphenylmethane, N,N'-bis-(3-amino-propyl)piperazine, and the like.

Dye-receptive compositions, preferably in the form of textile fibers, comprising 1–25% by weight of the above polycondensate and, correspondingly, 99–75% by weight of a synthetic polymer, e.g., a polyolefin.

BACKGROUND OF THE INVENTION

Field of the invention

The present invention relates to new basic polycondensates obtained by forming a condensation product of epichlorohydrin with a heterocyclic seven-membered disecondary diamine and then reacting the resulting condensation product with a polyamine containing primary amino groups. The present invention also relates to dye-receptive compositions, which can be used to form textile fibers (as well as films, ribbons, shaped articles and the like), which compositions are particularly receptive towards the dyestuffs which are generally used in the dyeing of wool.

Description of the prior art

Methods for modification of the receptivity to acid dyestuffs of polypropylene fibers by the addition to the polymer, before spinning, of various substances which act to modify the dyeability of the fibers are known. More particularly, methods have been proposed which involve the addition to the base polymer of basic nitrogen polycondensates obtained from epichlorohydrin and some amino compounds.

SUMMARY OF THE INVENTION

The present invention provides new basic nitrogen polycondensates and dye-receptive compositions having particular receptivity to wool dyestuffs comprising polyolefins having these new polycondensates admixed therewith. Thus, we have surprisingly found that textile fibers having a particular affinity for dyestuffs are obtained by extruding the dye-receptive compositions of the present invention, which compositions are mixtures of high molecular weight polymers with 1–25% by weight of the mixture of the basic nitrogen polycondensates of the present invention.

More particularly, the basic nitrogen polycondensates of the present invention are the reaction products obtained by (1) condensation of epichlorohydrin with a heterocyclic seven-membered disecondary diamine having the formula:

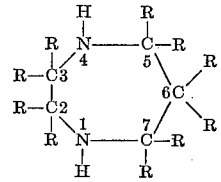

wherein the R radicals are the same or different radicals selected from the group consisting of hydrogen and alkyl radicals preferably having 1–12 carbon atoms, so as to obtain a condensation product having the formula:

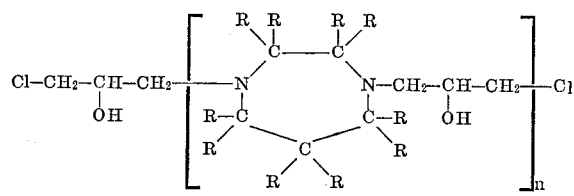

wherein R is as defined above and $n$ is an integer from 1 through 100; and (2) reacting this condensation product with a polyamine containing primary amino groups of the type

R—HN . . . X . . . NH$_2$

where R is H, an alkyl group or a residue of a heterocyclic nucleus and X is a residue of a bivalent hydrocarbon, optionally containing S, N, O etc., this polyamine being selected from the group consisting of hexamethylenediamine, ethylenediamine, diethylenetriamine, tetraethylenepentamine, aminoethylpiperazine, N-methylhexamethylenediamine, N - isopropylhexamethylenediamine, 3,3-diaminodipropylether, 3,3'-diaminodiphenylmethane, and N,N'-bis-(3-aminopropyl)piperazine; the molar ratios of epichlorohydrin/heterocyclic diamine/polyamine being within the range of 1/0.5–0.99/0.01–1.

The representative structural formula for the entire 3-component polycondensate may be specified as follows:

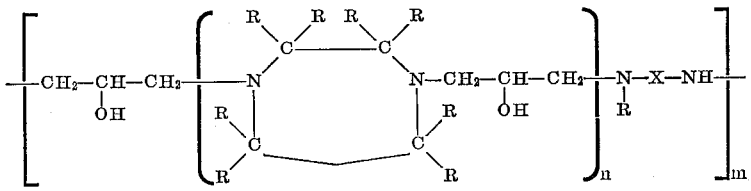

wherein $m$ and $n$ are integers from 1 to 100.

The dye-receptive compositions of the present invention comprise from about 1–25% by weight of the basic nitrogen polycondensate of the present invention and, correspondingly, from about 99–75% by weight of a crystalline polymer of an olefin having the formula $R-CH=CH_2$, wherein R is selected from the group consisting of hydrogen, alkyl radicals and aryl radicals having 1 to 12 C atoms.

The dye-receptive fibers of the present invention may be obtained by extrusion of the dye-receptive compositions of the present invention.

DESCRIPTION OF THE PREFERRED EMBODIMENTS

The preferred synthetic polymers for use in the compositions of the present invention are polyolefins having prevailingly isotactic structure, obtained by polymerization under low pressure, with stereospecific catalysts. More preferably, polypropylene consisting essentially of isotactic macromolecules is used. Other polymers suitable for use in the compositions of the present invention include the crystalline polyolefins obtained from monomers having the formula $R-CH=CH_2$, wherein R is an alkyl or aryl group having 1 to 12 C atoms or a hydrogen atom, e.g., polyethylene, polybutene-1, polypentene-1, polyhexene-1, poly-4-methylpentene-1, polyoctene-1, polystyrene etc. In addition to the olefin polymers, polymers of different monomers, including acrylic, vinyl and similar polymers, e.g., acrylonitrile polymers, vinyl chloride polymers, etc. may be modified with the polycondensates of the present invention to form dye-receptive compositions suitable for use in preparing dye-receptive fibers, etc.

Suitable heterocyclic disecondary diamines for use in preparing the polycondensates include:

5,5,7-trimethylhomopiperazine:

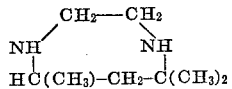

5,6,7-trimethylhomopiperazine:

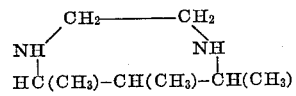

5,7-dimethylhomopiperazine:

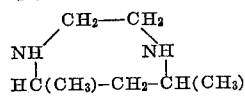

5,6-dimethyl-7-propylhomopiperazine:

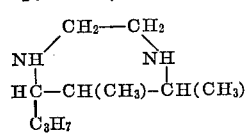

tetramethylhomopiperazine and similar compounds. The synthesis of these compounds has been described, e.g., in U.S. patent application Ser. No. 591,687.

The polycondensates of the present invention contain the following structural units:

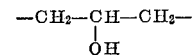

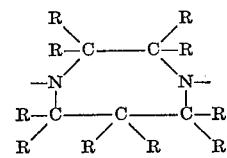

wherein R is as defined above, and residues of the polyamides used.

The present invention provides certain economical advantages, in that the cost of the modifier agents used and of the starting materials necessary for their synthesis is low, as compared to that for the prior art modifiers.

The mixing of the basic nitrogen polycondensates with the polyolefin is generally carried out by simply mixing the polycondensate with the polymer, under agitation. However, it is possible to carry out the addition by other methods, such as mixing the polyolefin with a solution of the polycondensate in a suitable solvent, followed by evaporation of the solvent itself, or by addition of the polycondensates to the polyolefin at the end of the polymerization. It is further possible to apply the polycondensate to the manufactured articles, for instance by immersing the articles in a solution or dispersion of the polycondensate and then evaporating the solvent. The application may be made before or after the stretching of the fibers, for times of from a few seconds to several hours, at temperatures varying from room temperature to 10° C. below the softening point of the polyolefin.

Generally, the mixtures are granulated and then extruded with melt spinning devices through circular spinnerets preferably having length/diameter ratios higher than 1, or through non-circular spinnerets.

The granulation and the spinning of the mixes are preferably carried out by working in the absence of oxygen, under an atmosphere of an inert gas, e.g., nitrogen. The spinning of the mixes may be also carried out in the presence of a small amount of a solid dispersing agent, for example, cetyl alcohol, stearic acid, stearamide, N-dihydroxyethyl-lauramide, and the like.

During the mixing, in addition to the polycondensates of the present invention, opacifiers (such as $TiO_2$, $CaCO_3$, ZnO), organic and inorganic stabilizers (such as lauryl-thio-dipropionate, trisnonylphosphite, calcium stearate, ZnS) and dyeing pigments (such as Cadmium Yellow, C.I. 37; Chromoftal BR, C.I. 144; Nylofile BLL, C.I. 15) may also be added to the polymers.

The fibers, after spinning, may be subjected to a stretching process, with stretching ratios between about 1:2 and 1:10, at temperatures of about 80–150° C., in drawing devices heated with warm air, or steam, or with a similar fluid, or provided with a heating plate. It is then possible to subject the fibers to dimensional stabilization, under free or prevented shrinking conditions, at about 80–160° C.

The fibers obtained by extrusion of the mixes of the present invention can be mono or plurifilaments and may be used for the preparation of continuous thread or staple, or for the preparation of bulk yarns or bulk staples. The mono and plurifilaments prepared according to the present invention may, if necessary, be treated with reactants capable of rendering the nitrogen polycondensates present in the manufactured article completely water-insoluble. Particularly suitable for this treatment are mono and diepoxy compounds (such as ethylene oxide, ethyleneglycoldiglycidylether), mono and diisocyanates (such a phenylisocyanates and 2,4-toluylene diisocyanate), mono and dialdehydes (such as formaldehyde, glyoxal), halogens, metal salts, and the like. These treatments are described, e.g., in British Pat. 942,131 and 982,953, and may be carried out before or after stretching.

The fibers obtained in accordance with the present invention have a remarkable receptivity towards the acid, metallized and plastosoluble dyestuffs. The dyed fibers also exhibit an increased stability, particularly to light.

The compositions according to the present invention can also be used for the preparation of films, ribbons, shaped articles and the like. The fibers and the other manufactured articles can also be subjected to an acid treatment which further improves the dyeability and the fastness of the dyeings (for instance according to U.S. Pat. 3,151,928).

The dyeings were carried out for an hour and a half at the boiling point, in dyebaths containing 2.5% of dyestuff (plastosoluble, acid or metallized dyestuff) by weight of the fiber, with a fiber/dyebath ratio of 1:40. The dyeings with acid and metallized dyestuffs were carried out in the presence of 1% by weight of the fiber of a surfactant consisting of the condensation product of ethylene-oxide and an alkyl phenol such as Aionico SCL of Soc. Chimica Lombarda A.E. Bianchi, Rho (Milan) Italy or sodium alkylbenzenesulfonates such as Dispergal SCL–G of Montecatini-Edison or the sodium salt of N-oleyl-N-methyltaurine. 30 minutes after the beginning of the boiling, 2% by weight of the fiber of a 20% acidic acid solution was added in order to improve the dyebath exhaustion. The dyeings with plastosoluble dyestuffs were carried out in the presence of 2% of the surfactant by the weight of the fiber.

After dyeing, the fibers were rinsed with running water, and were intensely dyed. The fastness of the dyeings to light, washing, cleaning with trichloroethylene and to rubbing were completely satisfactory.

The following examples are presented to further illustrate the invention without limiting its scope.

EXAMPLE 1

Into a one liter 3-necked flask, provided with a stirrer, thermometer and reflux condenser, there were introduced 142.2 g. (1 mol) of 5,5,7-trimethylhomopiperazine, 101.75 g. (1.1 mols) of epichlorohydrin and 230 cc. of isopropyl alcohol.

The mixture was refluxed for 10 hours. During the last 8 hours of reflux 36 g. NaOH were added. Thereafter, a solution of 17.4 g. (0.15 mol) of hexamethylenediamine in 50 cc. of isopropyl alcohol was added and the resulting mixture refluxed for an additional 6 hours. During the last 2 hours of refluxing, 9.3 g. of NaOH were added. After an additional 4 hours of refluxing, the reaction mixture was filtered to separate sodium chloride and the solvent then removed by distillation under reduced pressure (110–120° C. under a residual pressure of 2–3 mm. Hg).

The resinous material thus obtained, after drying, had a light yellow shade, was brittle, and was slightly soluble in water.

The percent nitrogen found was 14.2 (calculated=14.55).

40 g. of the polycondensate thus obtained (ground into a fine powder) were mixed with 0.956 kg. of polypropylene, 3 g. of calcium stearate and 1 g. of $TiO_2$ at room temperature in a Henschel mixer.

The polypropylene used had the following characteristics: $[\eta]=1.54$ (determined in tetrahydronaphthalene at 135° C.); ash content=0.012%; residue after the heptane extraction=97.2%.

The resulting mixture was granulated in an extruder under an oxygen-free atmosphere at 220° C.

The granulate obtained was spun with a laboratory melt spinning device under the following conditions:

spinning temperature=250° C.
spinneret type=10/0.8 x 16 mm.

After stretching and treatment with a 3% aqueous solution of ethyleneglycol diglycidyl ether, followed by heating at 140° C. for 10 minutes, the fiber had the following characteristics:

tenacity (g./den.)=5.13
elongation (percent)=27.

The fibers were dyeable with acid, chrome, metallized and plastosoluble dyestuffs, including Brilliant Blue Alizarine Fallon BL (C.I. Acid Blue 80), Violet Neolan, 5 RF (C.I. Acid Violet 58), Lanasyn Red 2 GL (C.I. Acid Red 216), Brown Lanasyn GRL, Yellow Supranol Fast 4 GL (C.I. Acid Yellow 79).

EXAMPLE 2

Into a 1 liter, 3-necked flask, provided with a stirrer, thermometer and reflux condenser, there were introduced 142.2 g. (1 mol) of 5,5,7-trimethylhomopiperazine, 101.75 g. (1.1 mols) of epichlorohydrin and 230 cc. of isopropyl alcohol.

The mixture was refluxed for 10 hours, 36 g. of NaOH being added during the last 8 hours of reflux. Then a solution of 7.2 g. (0.12 mol) of ethylenediamine in 20 cc. of isopropyl alcohol was added and the resulting mixture refluxed for an additional 6 hours, 9.3 g. of NaOH being added during the last 2 hours of refluxing. After an additional 4 hours of refluxing, the reaction mixture was filtered to separate sodium chloride and the solvent then removed by distillation.

The resinous material thus obtained, after drying, had a light yellow color, and was brittle and slightly soluble in water. The percent nitrogen found was 14.5 (calculated=14.8%).

40 g. of the polycondensate thus obtained (ground into a fine powder) were mixed with 0.956 kg. of polypropylene, 3 g. of calcium stearate and 1 g. of $TiO_2$ at room temperature in a Henschel mixer.

The polypropylene used had the following characteristics:

$[\eta]=1.54$ (determined in tetrahydronaphthalene at 135° C.) ash content=0.012%
residue after the heptane extraction=97.2%.

The resulting mixture was granulated in an extruder under an oxygen-free atmosphere at 220° C.

The granulate obtained was spun with a laboratory melt spinning device under the following conditions:

spinning temperature=250° C.
spinneret type=10/0.8 x 16 mm.

After stretching and treatment with a 3% aqueous solution of ethyleneglycol diglycidyl ether, followed by heating at 140° C. for 10 minutes, the fiber had the following characteristics:

tenacity (g./den.)=5.5
elongation (percent)=26

The fibers were dyeable with acid, chrome, metallized, and plastosoluble dyestuffs, including Brilliant Blue Alizarine Follon BL (C.I. Acid Blue 80), Violet Neolan 5 RF (C.I. Acid Violet 58), Lanasyn Red 2 GL (C.I. Acid Red 216), Brown Lanasyn GRL, Yellow Supranol Fast 4 GL (C.I. Acid Yellow 79).

EXAMPLE 3

Into a 1 liter, 3-necked flask, provided with a stirrer, thermometer and reflux condenser, there were introduced 142.2 g. (1 mol) of 5,5,7-trimethylhomopiperazine, 101.75 g. (1.1 mols) of epichlorohydrin and 230 cc. of isopropyl alcohol.

The mixture was refluxed for 10 hours, 36 g. of NaOH being added during the last 8 hours. Then a solution of 12.36 g. (0.12 mol) of diethylenetriamine in 20 cc. of isopropyl alcohol was added and the resulting mixture refluxed for an additional 6 hours, 9.3 g. of NaOH being added during the last 2 hours. After an additional 4 hours of refluxing, the reaction mixture was filtered to separate sodium chloride, and solvent then removed by distillation.

The resinous material thus obtained, after drying, had a light yellow color and was brittle and slightly soluble in water. The percent nitrogen found was 14.9 (calculated 15.2%).

40 g. of the polycondensate thus obtained (ground into a fine powder) were mixed with 0.956 kg. of polypropylene, 3 g. of calcium stearate and 1 g. of $TiO_2$ at room temperature in a Henschel mixer.

The polypropylene used had the following characteristics:

$[\eta]=1.54$ (determined in tetrahydronaphthalene at 135° C.) ash content=0.012%
residue after heptane extraction=97.2%

The resulting mixture was granulated in an extruder under an oxygen-free atmosphere at 220° C.

The granulate obtained was spun with a laboratory melt spinning device under the following conditions:

spinning temperature=250° C.
spinneret type=10/0.8 x 16 mm.

After stretching and treatment with 3% aqueous solution of ethyleneglycol diglycidyl ether, followed by heating at 140° C. for 10 minutes, the fiber had the following characteristics:

tenacity (g./den.)=5.4
elongation (percent)=28

The fibers were dyeable with acid, chrome, metallized and plastosoluble dyestuffs, including Brilliant Blue Alizarine Follon BL (C.I. Acid Blue 80), Violet Neolan 5 RF (C.I. Acid Violet 58), Lanasyn Red 2 GL (C.I. Acid Red 216), Brown Lanasyn GRL, Yellow Supranol Fast 4 GL (C.I. Acid Yellow 79).

EXAMPLE 4

Into a 1 liter, 3-necked flask, provided with a stirrer, thermometer and reflux condenser, there were introduced 142.2 g. (1 mol) of 5,5,7-trimethylhomopiperazine, 111 g. (1.2 mols) of epichlorohydrin and 250 cc. of isopropyl alcohol.

The mixture was refluxed for 10 hours, 32 g. of NaOH being added during the last 8 hours. Then a solution of 27.8 g. (0.24 mol) of hexamethylenediamine in 50 cc. of isopropyl alcohol was added and the resulting mixture was refluxed for an additional 6 hours, 17.5 g. of NaOH being added during the last 2 hours. After an additional 4 hours of refluxing, the reaction mixture was filtered to separate sodium chloride and the solvent then removed from the filtrate by evaporation under reduced pressure.

The resinous material thus obtained, after drying at 120° C. under 2-3 mm. Hg. vacuum, had a light yellow color and was brittle and slightly soluble in water. The percent nitrogen found was 14.2 (calculated 14.6%).

40 g. of the polycondensate thus obtained (ground into a fine powder) were mixed with 0.956 kg. of polypropylene, 3 g. of calcium stearate and 1 g. of $TiO_2$ at room temperature in a Henschel mixer.

The polypropylene used had the following characteristics:

$[\eta]=1.54$ determined in tetrahydronaphthalene at 135° C.) ash content=0.012%
residue after heptane extraction=97.2%

The resulting mixture was granulated in an extruder under an oxygen-free atmosphere at 220° C.

The granulate obtained was spun with a laboratory melt spinning device under the following conditions:

spinning temperature=250° C.
spinneret type=10/0.8 x 16 mm.

After stretching and treatment with a 3% aqueous solution of ethyleneglycol diglycidyl ether, followed by heating at 140° C. for 10 minutes, the fiber had the following characteristics:

tenacity (g./den.)=5.7
elongation (percent)=22

The fibers were dyeable with acid, chrome, metallized and plastosoluble dyestuffs, including Brilliant Blue Alizarine Follon BL (C.I. Acid Blue 80), Violet Neolan 5 RF (C.I. Acid Violet 58), Lanasyn Red 2 GL (C.I. Acid Red 216), Brown Lanasyn GRL, Yellow Supranol Fast 4 GL (C.I. Acid Yellow 79).

EXAMPLE 5

Into a 1 liter, 3-necked flask, provided with a stirrer, thermometer and reflux condenser, there were introduced 156.2 g. (1 mol) of tetramethylhomopiperazine (obtained by hydrogenating 1,2 propylenediamine and mesityloxide), 101.75 g. (1.1 mols) of epichlorohydrin and 250 cc. of isopropyl alcohol.

The mixture was refluxed for 10 hours, 36 g. of NaOH being added during the last 8 hours. Then a solution of 12.36 g. (0.12 mol) of diethylenetriamine in 40 cc. of isopropyl alcohol was added and the resulting mixture was refluxed for an additional 6 hours, 9.3 g. of NaOH being added during the last 2 hours. After an additional 4 hours of refluxing, the reaction mixture was filtered to separate sodium chloride and the solvent then removed from the filtrate by heating at 110-120° C. under reduced pressure.

The resinous material thus obtained, after drying, had a yellow color and was brittle and slightly soluble in water. The percent nitrogen found was 14.0 (calculated 14.3%).

42 g. of the polycondensate thus obtained (ground into a fine powder) were mixed with 0.954 kg. of polypropylene, 3 g. of calcium stearate and 1 g. of $TiO_2$ at room temperature in a Henschel mixer.

The polypropylene used had the following characteristics:

$[\eta]=1.54$ (determined in tetrahydronaphthalene at 135° C.) ash content=0.012%
residue after heptane extraction=97.2%.

The resulting mixture was granulated in an extruder under an oxygen-free atmosphere at 220° C.

The granulate obtained was spun with a laboratory melt spinning device under the following conditions:

spinning temperature=250° C.
spinneret type=10/0.8 x 16 mm.

After stretching and treatment with a 3% aqueous solution of ethyleneglycol diglycidylether, followed by heating at 140° C. for 10 minutes, the fiber had the following characteristics:

tenacity (g./den.)=5.1
elongation (percent)=29

The fibers were dyeable with acid, chrome, metallized and plastosoluble dyestuffs, including Brilliant Blue Alizarine Follon BL ( C. I. Acid Blue 80), Violet Neolan 5 RF (C.I. Acid Violet 58), Lanasyn Red 2 GL (C.I. Acid Red 216), Brown Lanasyn GRL, Yellow Supranol Fast 4 GL (C.I. Acid Yellow 79).

Variations and modifications can, of course, be made without departing from the spirit and scope of the invention.

Having thus described the invention, what is desired to be secured by Letters Patent and is hereby claimed is:

1. A resinous basic nitrogen polycondensate consisting of the reaction product obtained by reacting a condensation product having the formula:

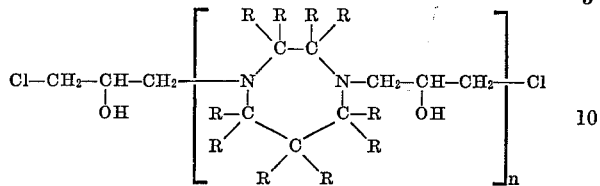

wherein the R radicals are the same or different radicals selected from the group consisting of hydrogen and alkyl radicals having 1–12 carbon atoms, and $n$ is an integer from 1 through 100 with a polyamine selected from the group consisting of hexamethylenediamine, ethylenediamine, diethylenetriamine, tetraethylenepentamine, N-methylhexamethylenediamine, N - isopropylhexamethylenediamine, 3,3 - diaminodipropylether, 3,3' - diaminodiphenylmethane, N,N' - bis - (3 - aminopropyl)piperazine, and aminoethylpiperazine; the molar ratios of epichlorohydrin:heterocyclic diamine:polyamine being within the approximate range of 1:0.5–0.99:0.01–1.

2. The polycondensate of claim 1 wherein said condensation product is prepared from the reaction of 5,5,7-trimethylhomopiperazine or tetramethylhomopiperazine with epichlorohydrin.

References Cited
UNITED STATES PATENTS 2,849,411    8/1958    Lehmann et al. _____ 260—29.2

WILLIAM H. SHORT, Primary Examiner

E. A. NIELSEN, Assistant Examiner

U.S. Cl. X.R.

260—239, 896, 898, 899